C. J. Baldwin,
Churn
No. 86,269.
Patented Jan. 26, 1869.
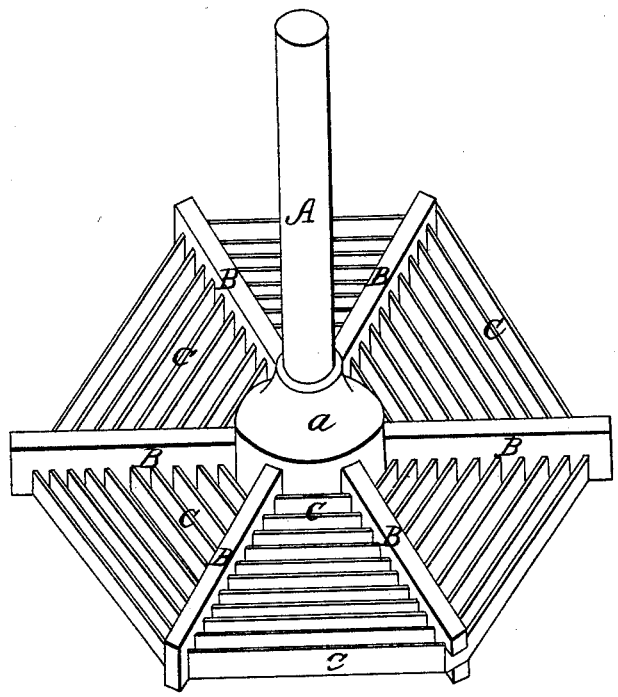
Witnesses.
John A Ellis
J. W. Mister
Inventor.
C. J. Baldwin
per
F. A. Alexander
Atty

C. J. BALDWIN, OF NORWALK, OHIO.

Letters Patent No. 86,269, dated January 26, 1869.

IMPROVEMENT IN CHURN-DASHER.

The Schedule referred to in these Letters Patent and making part of the same.

*To all whom it may concern:*

Be it known that I, C. J. BALDWIN, of Norwalk, in the county of Huron, and State of Ohio, have invented certain new and useful Improvements in Churn-Dashers; and I do hereby declare that the following is a full, clear, and exact description thereof, reference being had to the accompanying drawings, and to the letters of reference marked thereon, which form a part of this specification, and in which is represented a perspective view of my churn-dasher.

The nature of my invention consists in constructing a churn-dasher of a vertical bar or staff, provided with a number of right-angular bars, which are supplied on their lower surface with a series of metal plates or strips, the object of the above arrangement being designed to furnish a churn-dasher by which the butter may be thoroughly churned, and, at the same time, facilitate the gathering of it.

To enable others to make and employ my invention, I will now describe its construction and operation.

In the accompanying drawings—

A represents a vertical bar or staff fitting into a shoulder or hub, a, which is provided with a number of right-angular, bars B.

C represents a series of metal strips or plates, secured edgewise in the lower sides of the bars B, and by the employment of which the globules of butter, formed by the agitation of the milk, will be entirely consumed or reduced to the desired state, as the edges of these metal plates or strips will have a cutting-effect on the milk while being churned.

I construct the upper surface of the right-angular bars B, or that portion above the metal plates or strips C, with a sufficient width to retain or gather the butter that passes between the spaces of the said metal strips while churning, and thus facilitate the gathering of the same.

I do not claim the use of wire bars, as such have been heretofore patented; but

What I do claim, and desire to secure by Letters Patent, is—

The employment of a churn-dasher, having the right-angular bars B constructed as described, and supplied with the metal plates or strips C, arranged and operating substantially as and for the purpose set forth.

In testimony that I claim the foregoing as my own, I affix my signature, in presence of two witnesses.

C. J. BALDWIN.

Witnesses:
 T. H. ALEXANDER,
 WM. READ.